United States Patent [19]
Hsu

[11] Patent Number: 5,392,971
[45] Date of Patent: Feb. 28, 1995

[54] BOTTLE HOLDER FOR A BICYCLE

[76] Inventor: Jung-Tsan Hsu, 58, Ma Yuan West St., Taichung, Taiwan, Prov. of China

[21] Appl. No.: 72,278
[22] Filed: Jun. 4, 1993
[51] Int. Cl.⁶ .............................................. B62J 11/00
[52] U.S. Cl. ..................................................... 224/39
[58] Field of Search ........................ 224/39, 38, 37, 35

[56] References Cited

U.S. PATENT DOCUMENTS 4,386,721  6/1983  Shimano ................................ 224/39
5,217,149  6/1993  Simonett ........................... 224/39 X Primary Examiner—Renee S. Luebke
Attorney, Agent, or Firm—Peterson, Wicks, Nemer & Kamrath

[57] ABSTRACT

A bottle holder for a bicycle includes a plate, two sleeves formed in the side edges of the plate, a top frame and a bottom frame each having two legs engaged in the sleeves respectively so as to form a frame for holding the bottle. The number of dents are formed in each of the sleeves and extended inward of the sleeves and engaged with the legs of the top frame and the bottom frame such that the frames are solidly secured to the sleeves of the plate.

1 Claim, 4 Drawing Sheets

BOTTLE HOLDER FOR A BICYCLE

BACKGROUND OF THE INVENTION

1. Field of the Invention

The present invention relates to a holder, and more particularly to a bottle holder.

2. Description of the Prior Art

A typical bottle holder for a bicycle is disclosed in FIGS. 4 and 5 and comprises a body 10 including a frame 11, a coupling sleeve 12, and two plates 13, 14, in which the frame 11 is bent and formed by aluminum wire which includes two ends coupled together by a coupling sleeve 12. The plates 13, 14 are welded to the frame 11 as indicated by "a". However, the whole frame 11 is formed by a single wire which is too long such that the operators may feel inconvenient for bending the frame 11. In addition, the welding operations of the plates 13, 14 to the frame 11 are normally the argon arc welding process which may generate argon. However, argon is not good for the human body.

The present invention has arisen to mitigate and/or obviate the afore-described disadvantages of the conventional bottle holders.

SUMMARY OF THE INVENTION

The primary objective of the present invention is to provide a bottle holder for a bicycle in which the bottle holder includes a configuration which can be formed without welding processes.

In accordance with one aspect of the invention, there is provided a bottle holder for a bicycle comprising a plate including two side edges, a sleeve formed in each of the side edges of the plate, a top frame and a bottom frame each including two legs engaged in the sleeves respectively so as to form a frame body for holding a bottle, and a plurality of dents formed in each of the sleeves and extended inward of the sleeves and engaged with the legs of the top frame and the bottom frame, whereby, the top frame and the bottom frame are solidly secured to the sleeves of the plate. The bottle holder can thus be formed without welding processes, such that the workers for forming and manufacturing the bottle holder will not be hurt by argon gas.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figures 1, 2:
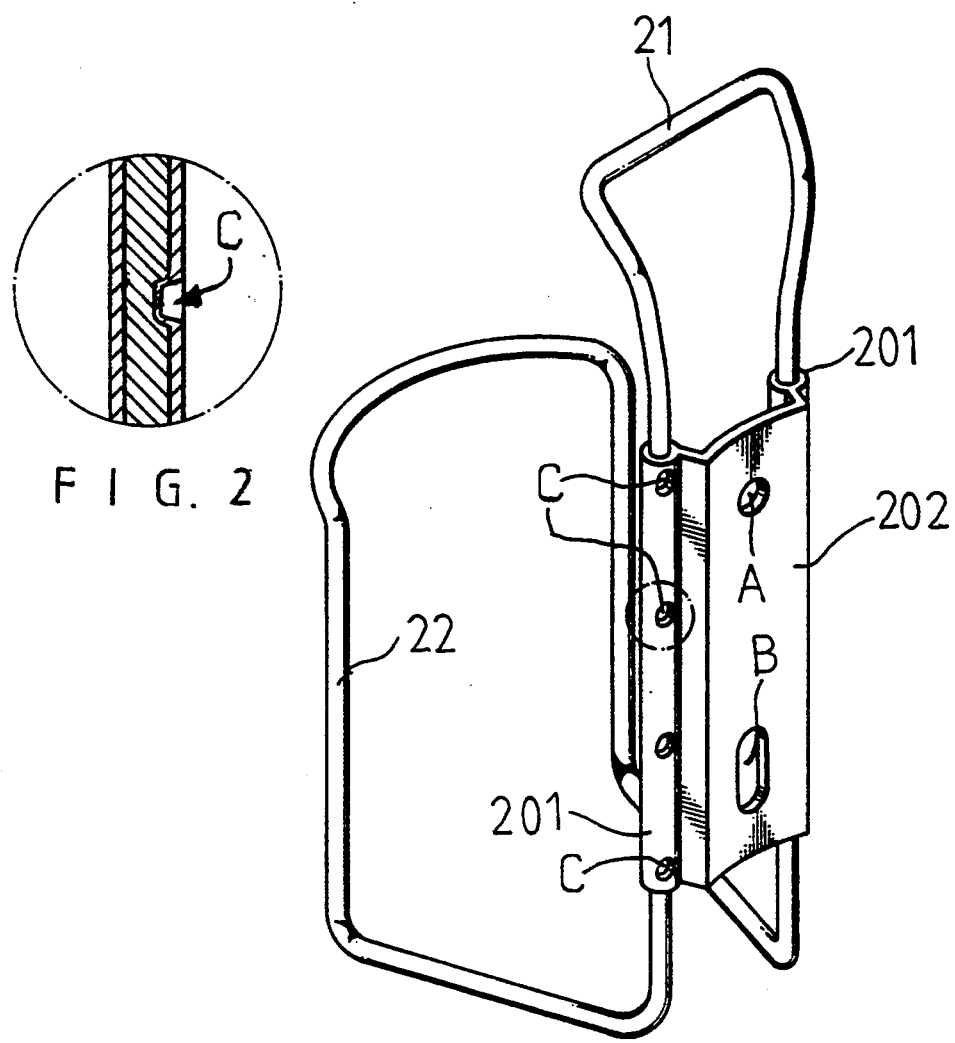
FIG. 1 is a perspective view of a bottle holder in accordance with the present invention.
FIG. 2 is a partial cross sectional view of the bottle holder.
Figure 3:
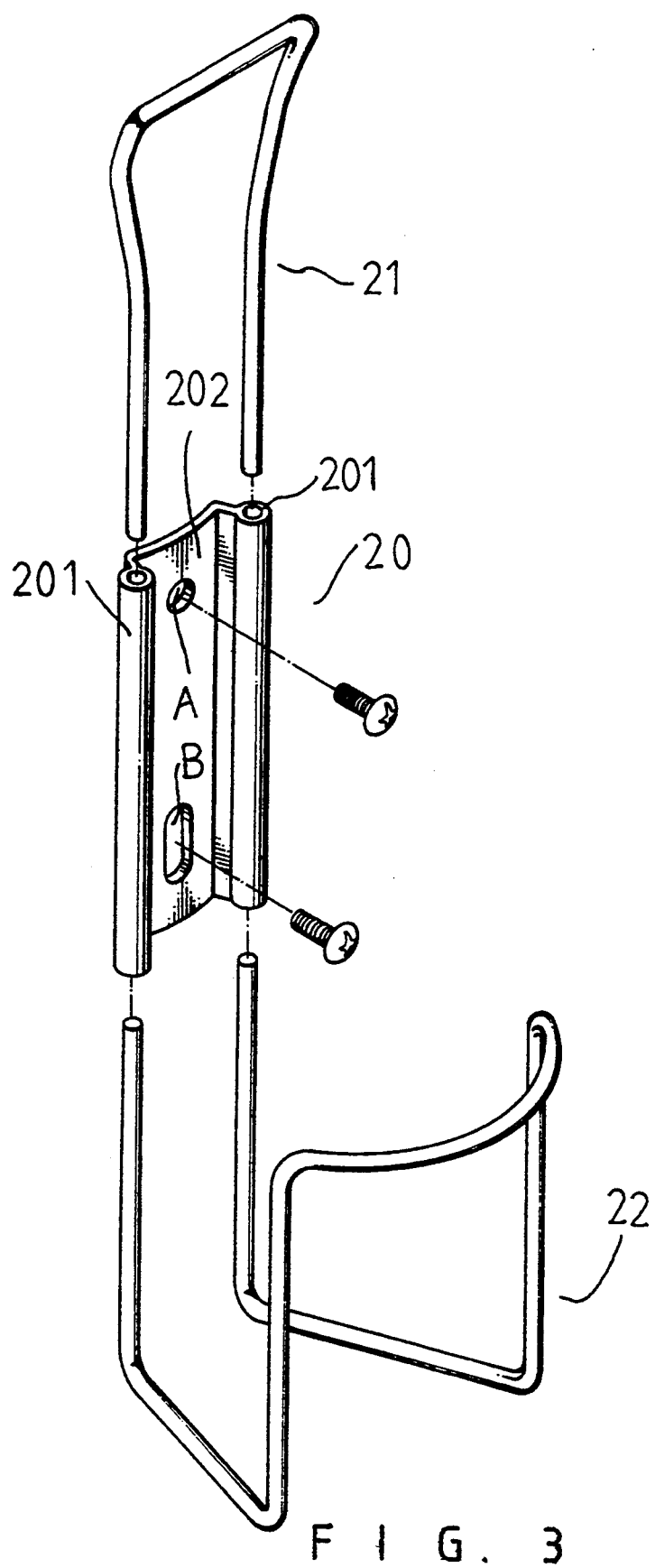
FIG. 3 is an exploded view of the bottle holder.
Figure 4:
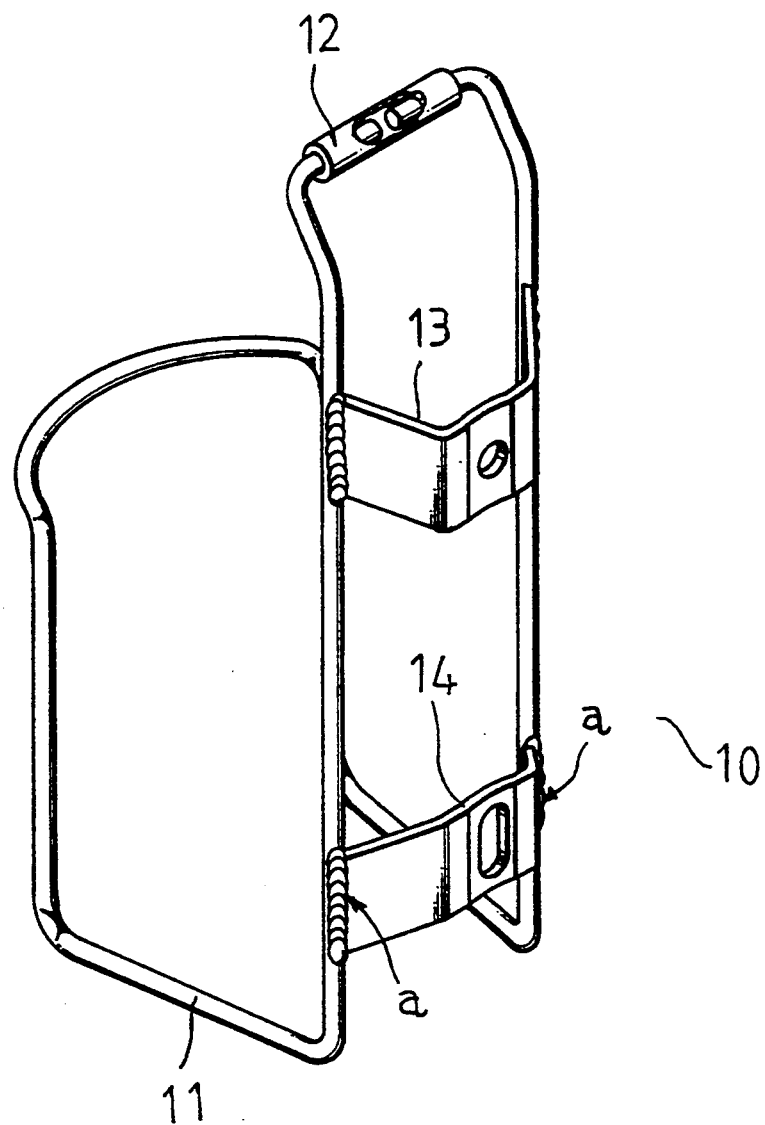
FIG. 4 is a perspective view of a typical bottle holder.
Figure 5:
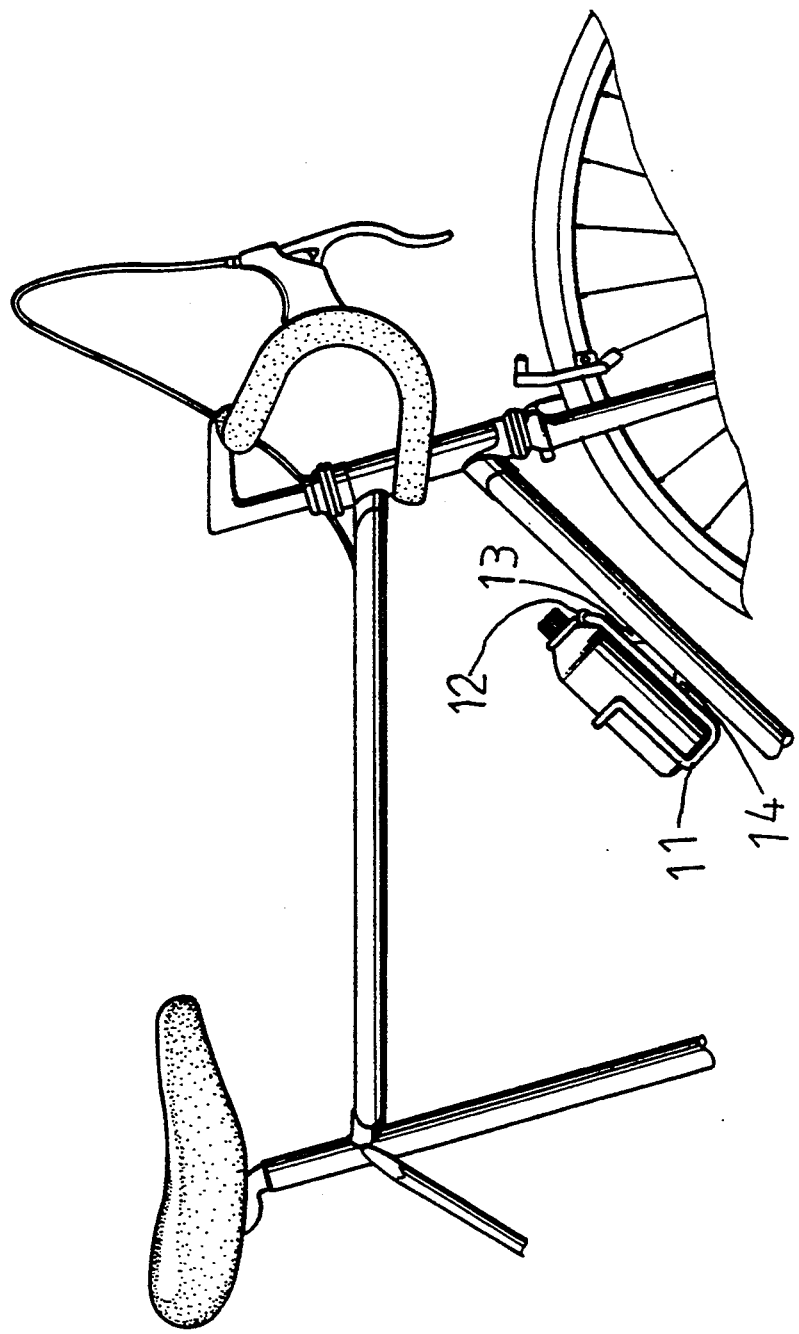
FIG. 5 is a plane view illustrating the application of the bottle holder.

Referring to FIGS. 1 to 3, a bottle holder 20 for a bicycle in accordance with the present invention comprises a plate 202 having two side edges, each of the side edges has a sleeve 201 formed therein. The plate 202 includes an aperture "A" and an oblong hole "B" formed therein for engaging with screws so as to fix the bottle holder 20 to a bicycle; a top frame 21 and a bottom frame 22 each include two legs engaged in the sleeves 201 of the plate 202. A plurality of dents "C" are formed in the sleeves 201 and extend inward of the sleeves 201 and engage with the legs of the frames 21, 22, best shown in FIG. 2, such that the frames 21, 22 can be solidly fixed to the plate 202. The frames 21, 22 form a frame for holding a bottle. The dents C are formed after the frames 21, 22 are inserted into the sleeves 201 and are formed by hammering a pin element into the sleeves and the frames, for example, the formation of the dents is not related to the present invention and will not be described in further details.

Accordingly, the bottle holder in accordance with the present invention includes two frames 21, 22 which are formed by two shorter wires separately such that the workers for forming the frames will not feel inconvenient. In addition, no welding processes are required to form the frame such that no argon will be generated. The workers for forming and manufacturing the bottle holder thus will not be hurt by the argon gas.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. The bottle holder for a bicycle comprising a plate including two side edges, a sleeve formed in each of said side edges of said plate, a top frame and a bottom frame each including two legs engaged in said sleeves respectively so as to form a frame body for holding a bottle, and a plurality of dents formed in each of said sleeves and extended inward of said sleeves and engaged with said legs of said top frame and said bottom frame, whereby, said top frame and said bottom frame are solidly secured to said sleeves of said plate.

* * * * *